United States Patent
Han et al.

(10) Patent No.: US 9,209,844 B2
(45) Date of Patent: Dec. 8, 2015

(54) SUBSAMPLING RECEIVER USING INTERSTAGE OFF-CHIP RF BAND PASS FILTER

(71) Applicant: Electronics and Telecommunications Research Institute, Daejeon (KR)

(72) Inventors: Seon-Ho Han, Daejeon (KR); Hyun Kyu Yu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 234 days.

(21) Appl. No.: 13/737,726

(22) Filed: Jan. 9, 2013

(65) Prior Publication Data

US 2013/0178179 A1 Jul. 11, 2013

(30) Foreign Application Priority Data

Jan. 11, 2012 (KR) .................. 10-2012-0003574
Jul. 11, 2012 (KR) .................. 10-2012-0075612

(51) Int. Cl.
| | | |
|---|---|---|
| H04B 1/10 | (2006.01) | |
| H04B 1/22 | (2006.01) | |
| H04B 1/06 | (2006.01) | |
| H04B 1/00 | (2006.01) | |

(52) U.S. Cl.
CPC ............ *H04B 1/06* (2013.01); *H04B 1/0014* (2013.01)

(58) Field of Classification Search
CPC .......... H04B 1/0025; H04B 1/22; H04B 1/10; H04B 1/1027

USPC .............. 455/323–324, 232.1, 255, 256, 257, 455/258, 266, 307, 313, 334, 341
See application file for complete search history.

(56) References Cited

U.S. PATENT DOCUMENTS

| | | | | |
|---|---|---|---|---|
| 5,640,698 | A  * | 6/1997 | Shen et al. ................... | 455/323 |
| 6,459,743 | B1 | 10/2002 | Lipka | |
| 6,476,754 | B2 | 11/2002 | Lowenborg et al. | |
| 6,775,530 | B2 | 8/2004 | Severson et al. | |
| 7,110,732 | B2 | 9/2006 | Mostafa et al. | |
| 7,443,783 | B2 * | 10/2008 | DeChamps et al. .......... | 370/208 |
| 2002/0169603 | A1 | 11/2002 | Sculley | |

(Continued)

FOREIGN PATENT DOCUMENTS

| | | |
|---|---|---|
| KR | 10-2011-0092197 A | 8/2011 |
| KR | 10-2011-0093574 A | 8/2011 |

OTHER PUBLICATIONS

Aria Eshraghi et al., "A Comparative Analysis of Parallel Delta-Sigma ADC Architectures", IEEE Transactions on Circuits and Systems, Mar. 2004, pp. 450-458, vol. 51, No. 3.

(Continued)

Primary Examiner — Blane J Jackson

(57) ABSTRACT

The inventive concept relates to a wireless communication receiver. The wireless communication receiver includes a second off-chip RF filter, an RF-to-digital converter and a digital pre-processor processing a signal converted into a digital. The RF-to-digital converter converts an RF signal being received into a digital signal of DC frequency band or intermediate frequency band and has a dynamic range that can process a wanted RF band signal and unwanted signals near to the wanted RF band signal. The digital pre-processor digitally controls a signal gain to transmit it to a modulator/demodulator.

21 Claims, 12 Drawing Sheets

(56) References Cited

U.S. PATENT DOCUMENTS

2003/0050027 A1   3/2003   Muhammad et al.
2003/0100286 A1*  5/2003   Severson et al. .............. 455/324

OTHER PUBLICATIONS

Ronald F. Cormier, Jr. et al., "Combining Subband Decomposition and Sigma Delta Modulation for Wideband A/D Conversion", ISCAS 1994, pp. 357-360, vol. 5.

Munkyo Seo et al., "Comprehensive Digital Correction of Mismatch Errors for a 400-Msamples/s 80-dB SFDR Time-Interleaved Analog-to-Digital Converter", IEEE Transactions on Microwave Theory and Techniques, Mar. 2005, pp. 1072-1082, vol. 53, No. 3.

Fang Xu et al., "Perfect data reconstruction algorithm of time interleaved ADCs", IEEE, Nov. 2008, pp. 1-6.

Ronald F. Cormier, Jr. et al., "A Fourth Order Bandpass Delta-Sigma Modulator with Digitally Programmable Passband Frequency", Analog Inergrated Circuits and Signal Processing, Oct. 1996, pp. 217-229, 12, Kluwer Academic Publishers, Boston.

* cited by examiner

Fig. 7B
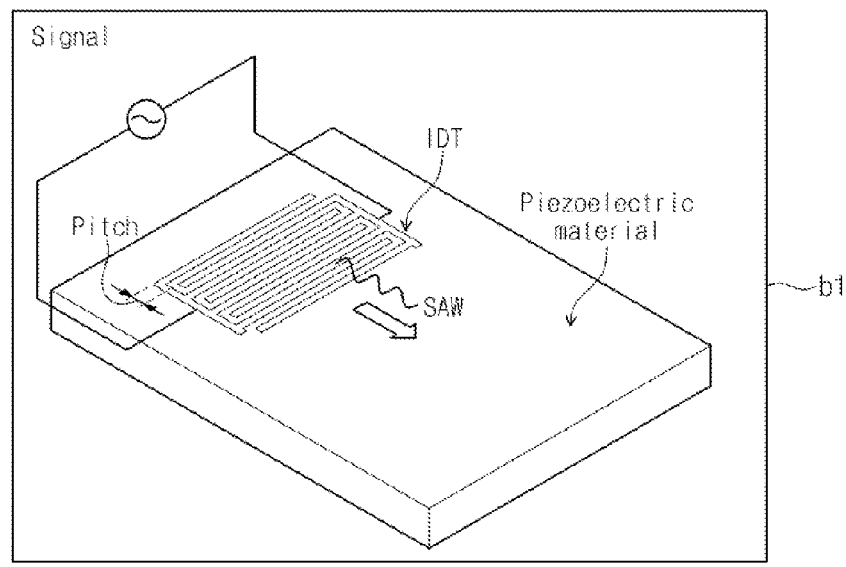
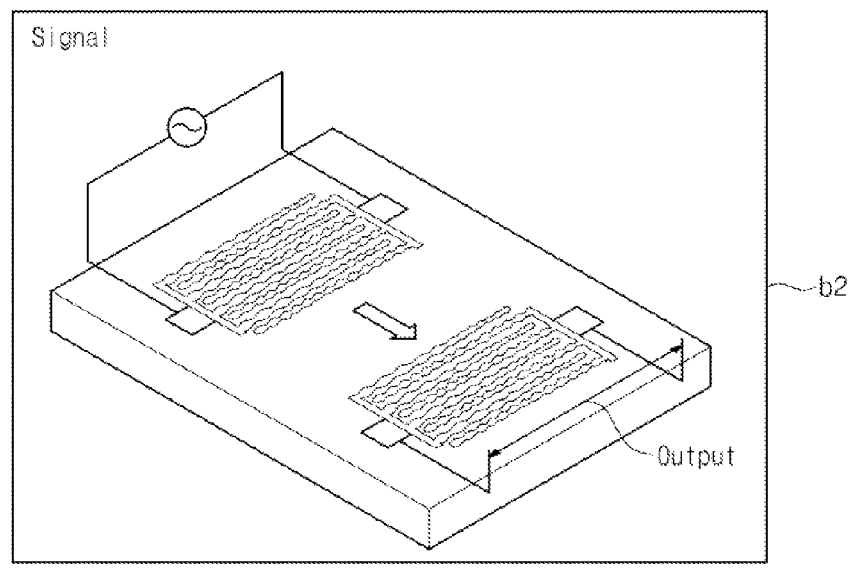

Fig. 7C
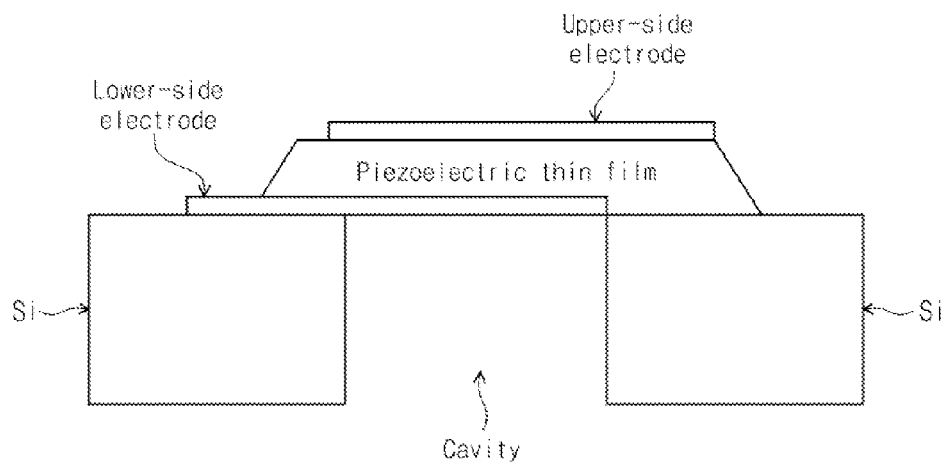
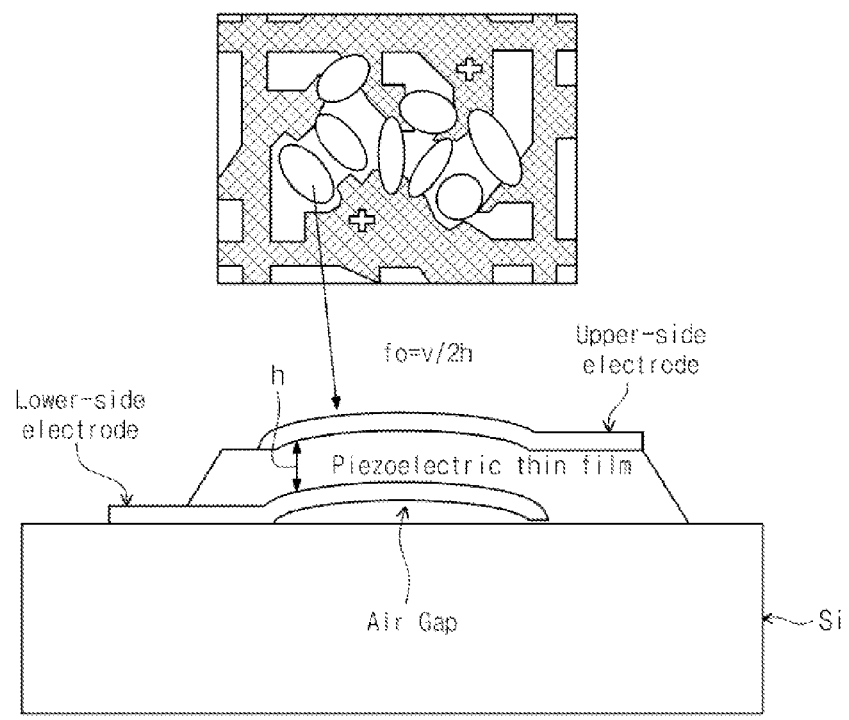

SUBSAMPLING RECEIVER USING INTERSTAGE OFF-CHIP RF BAND PASS FILTER

CROSS-REFERENCE TO RELATED APPLICATIONS

This U.S. non-provisional patent application claims priority under 35 U.S.C. §119 of Korean Patent Application No. 10-2012-0075612, filed on Jul. 11, 2012, the entire contents of which are hereby incorporated by reference.

BACKGROUND

The present inventive concept herein relates to wireless communication receivers, and more particularly, to a sub-sampling receiver that can digitally process noise signals near to a wanted signal.

An RF integrated circuit uses an LC resonant circuit to amplify a wanted signal and the LC resonant circuit has a band filter characteristic. However, since a resonant circuit of integrated circuit has a quality factor which is not good, it is inadequate to filter a wanted signal in a wanted RF band. Thus, at the front of receiver integrated circuit of high-end application field, to increase a selectivity of signal, it is necessary to use a pre-filter that can greatly reduce out-of-band signal components while having a high selectivity for in-band signals.

When realizing a sub-sampling receiver including an RF-to-digital converter that directly converts an RF signal into a digital signal, since the sub-sampling receiver is advantageous for a multiple band multiple mode, a multiple input multiple output (MIMO) and a carrier aggregation (CA), a high-end application is possible.

SUMMARY

Embodiments of the inventive concept provide a receiver. The receiver may include an RF front end portion secondary band pass-filtering a signal that primarily passes a band and is amplified to attenuate a noise and an interference signal other than a band signal; an analog-digital converting portion that performs a sub-sampling on a carrier frequency of wanted signal band according to clock signals, performs an over sampling on a wanted signal band according to the clocks, converting an analog signal output from the RF front end portion into a digital signal of a DC frequency band or an intermediate frequency band and has an input signal range capable of processing a wanted signal and unwanted signals near to the wanted signal; a signal processing portion digitally pre-processing and demodulating a digital signal output from the analog-digital converting portion; and a detection controlling portion detecting a mismatch between channel data (with IQ mismatch) of the digital signal output from the analog-digital converting portion and controlling phases of the clock signals.

Embodiments of the inventive concept also provide a receiver. The receiver may include an off-chip band pass filter of interstage type receiving an output of variable gain amplifier of the RF front-end portion to perform a direct anti-aliasing filtering, the off-chip band pass filter being embodied in a type of SAW filter or FBAR filter; a digital signal processing portion digitally removing a noise signal near to a frequency band set in a digital signal being received and digitally processing a signal within the setting frequency band; and an analog-digital converter generating the digital signal of the digital signal processing portion by converting an analog signal output from the off-chip band pass filter into a digital signal covering an input signal range that can process a wanted signal and unwanted signals near to the wanted signal using a sub-sampling frequency clock.

Embodiments of the inventive concept also provide a receiver. The receiver may include a first off-chip filter band-filtering an input signal; a single input-output variable gain amplifier band-filtering and amplifying a signal output from the first off-chip filter and changing a range of input signal into a range of input signal of next stage; a second off-chip filter constituted by a SAW filter or a FBAR filter to band-filter an output of the single input-output variable gain amplifier again; an RFDC (RF to digital converter) based on ADC converting an output signal of the second off-chip filter into a digital signal of a DC frequency band or an intermediate frequency band using a sampling frequency performing a sub-sampling on a carrier frequency of signal and performing an over sampling on a band of wanted signal as a clock signal and having an input signal range that can process a wanted signal and unwanted signals near to the wanted signal; and a digital processor performing a signal frequency conversion, a channel filter and a variable gain amplification, and a sampling frequency conversion on the output converted into a digital signal in the RFDC through a digital signal processing.

BRIEF DESCRIPTION OF THE FIGURES

Preferred embodiments of the inventive concept will be described below in more detail with reference to the accompanying drawings. The embodiments of the inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

FIG. 7B is a drawing illustrating a production and an operation of SAW filter applied to the FIG. 4 or FIG. 5.

FIG. 7C is a drawing illustrating a production form of FBAR filter applied to the FIG. 4 or FIG. 5.

DETAILED DESCRIPTION OF THE EMBODIMENTS

Figure 1:
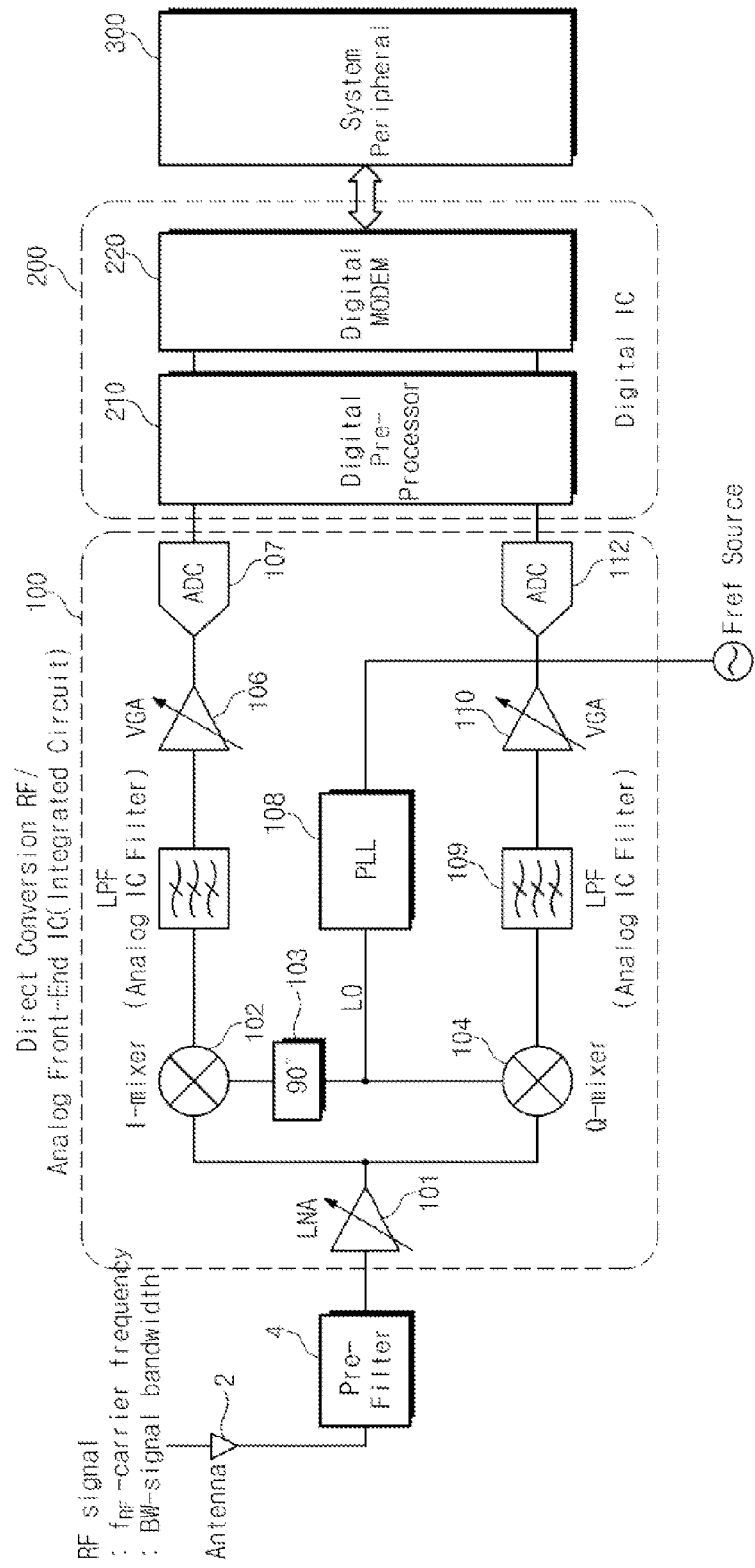
FIG. 1 is a block diagram of receiver based on a conventional integrated circuit.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

In the specification, an off-chip device describes not only devices which are simply outside the chip but also devices which are difficult to be manufactured through the same manufacturing process as that of conventional integrated circuit devices such as transistor, inductor, resistor and capacitor. This is because even off-chip devices may be connected to circuit blocks which are inside the package by various methods and one chip package including off-chip devices can be made. In some cases, an integrated circuit chip may be embodied on the same die together with off-chip devices.

Generally, in a receiver, a signal which passed through a first filter of input stage is converted into a low frequency band through an RF mixer. The signal converted into a low frequency band is applied to an analog filter integrated circuit and the analog filter integrated circuit additionally reduces the rest of out-of-band signals. In this case, a characteristic of second filter required in the analog filter integrated circuit should satisfy a linearity which the receiver requires. Also, the second filter should have a characteristic that makes an effect of aliasing noise generated by a sampling of analog-to-digital convertor on SNR of the receiver small.

To obtain an additional filter characteristic required after a first SAW filter, an integrated circuit of I/Q mixer and a low pass filter (LPF) may be embodied. If an RF signal is converted into a low frequency band by a mixer once, an analog filter integrated circuit is easily designed.

If embodying an integrated circuit of I/Q mixer and a LPF, an off-chip device may not be used. However, as the amount of data required gradually increases, a mobile communication receiver of high-end application field needs a receiver accommodating a multiple input multiple output (MIMO) and a carrier aggregation (CA). Thus, since a receiver structure of parallel path is essential to perform a concurrent operation, receiver complexity rapidly increases. Moreover, since a channel bandwidth is also variable to effectively use a channel, a design of analog LPF becomes complicated. Thus, it is increasingly difficult to design a receiver.

That receiver should support a conventional multiple mode and should also support a multiple band for a regional compatibility. A communication device with advanced features should accommodate a receive mode for a wireless local area network (LAN) or GPS. Integrating everything in one chip more and more increases difficulties in a design. To embody a recent multifunctional receiver structure, it is necessary to attempt a simpler embodiment method.

A conventional receiver structure will be described blow.

Figure 2:
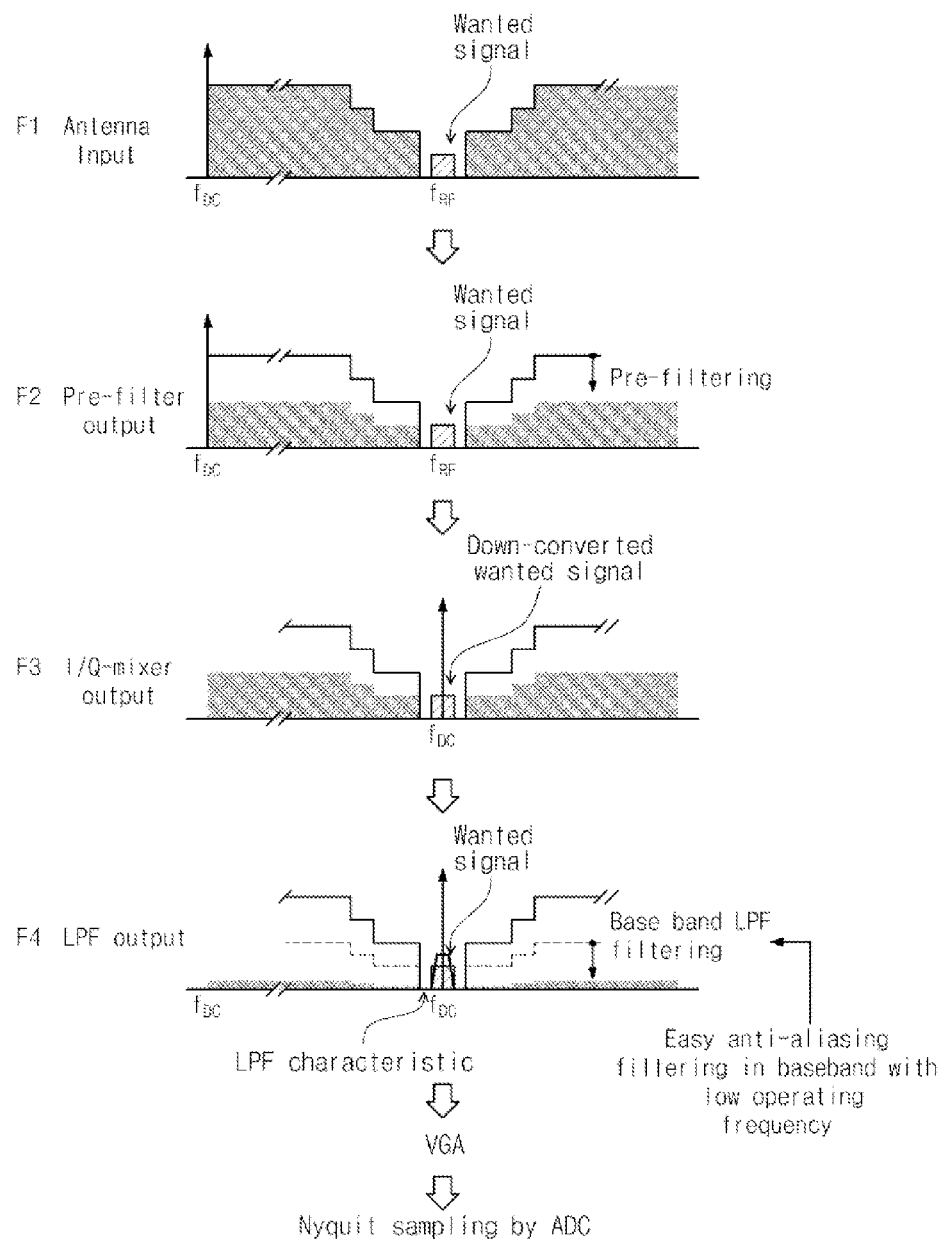
FIG. 2 shows waveforms sequentially appeared in the block diagram of receiver illustrated in FIG. 1.

FIG. 1 is a block diagram of receiver based on a conventional integrated circuit. FIG. 2 shows waveforms sequentially appeared in the block diagram of receiver illustrated in FIG. 1.

The receiver structure of FIG. 1 typically represents a structure of direct conversion receiver among various receiver structures.

In the receiver of FIG. 1, a signal received through an antenna 2 is band-filtered by a pre-filter 4 and amplified through a LAN 101, and then is frequency-converted into a low frequency band through channel mixers 102 and 104. After the frequency converted signals are low frequency-filtered by channel by LPFs 105 and 109, they are amplified by variable gain amplifiers (VGA) 106 and 110 so that ADCs 107 and 112 can receive a signal having a fixed magnitude. A digital integrated circuit 200 including a digital pre-processor 210 for pre-processing and a digital modem 220 performing a modulating/demodulating function digitally processes A/D converted signals to provide them to a system peripheral 300.

Since in a conventional receiver like FIG. 1, it is difficult to embodying a filter picking out only wanted signals from a high RF frequency band, the conventional receiver has a structure that a wanted signal is obtained using an analog filter after lowering a signal frequency to a low frequency once.

If a signal waveform of F1 of FIG. 2 is received through the antenna 2, the pre-filter 4 performs a pre-processing to output a signal waveform F2. The mixers 102 and 104 receive channel signals to output signals converted into a low frequency like a signal waveform F3. The LPFs 105 and 109 perform a low frequency filtering on signals outputting from the mixers 102 and 104 respectively to output a signal waveform F4 of FIG. 2. In FIG. 2, a horizontal axis represents a frequency and a vertical axis represents a voltage level of signal.

Since a low frequency conversion using the mixer finally reduces an operation frequency of the ADCs converting an analog signal into a digital signal, the embodiment of the ADCs becomes easy. If fixing a magnitude of signal inputting in the ADCs to an any reference magnitude using a variable amplifier, a dynamic range of ADCs is designed to be s relatively small and thereby a circuit can be easily embodied.

Since the analog filter located at the next stage of the mixer uses an analog design technology, it is difficult to change a passing band frequency of the filter. Thus, it is necessary to use one analog filter with respect to each channel signal being received through the antenna. To achieve this, a frequency synthesizer 108 synthesizing a frequency of local oscillator (LO) supplied to the analog mixer is included. If each center frequency is made using the frequency synthesizer 108 to be supplied to the mixer, a center frequency of signal converted into a low frequency band is fixed.

Since the conventional receiver like FIG. 1 has to filter out unwanted interfering signals until AD conversion is performed, it needs devices such as a frequency synthesizer, a mixer, a filter and a variable gain amplifier. The devices are blocks processing an analog signal. A lot of times are needed to design the devices and the devices have to be redesigned whenever a process is upgraded.

The conventional receiver like FIG. 1 has disadvantages in power consumption, chip area and quick market adaptability.

A wireless transmitter/receiver including many digital design elements, which breaks from the conventional receiver like FIG. 1, can make up for disadvantages occurring when using an analog design method in so many ways but there are a lot of difficulties to actually realize the wireless transmitter/receiver.

In case of wireless receiver directly sampling a high frequency band signal to perform a digital signal processing, since an analog-digital converter (ADC) has to have a high bit resolution while operating at a very high frequency, it is difficult to realize the wireless receiver with the known technologies. This is because it is difficult to satisfy a Nyquist theorem that only when a sampling frequency of ADC is at least more than two times a carrier signal (a signal bandwith/2), a signal can be restored. To process a signal of 2 GHz band, an ADC having a sampling frequency of 4 GHz should be embodied. To accept not only an operation speed but also a great input signal, a dynamic range of ADC should be great. Even though such an ADC is embodied, since an output speed of data of ADC is very high, it is difficult that a digital processor located at back stage of ADC processes the data. Power consumption in the digital processor is very great due to a high processing speed.

Figure 3:
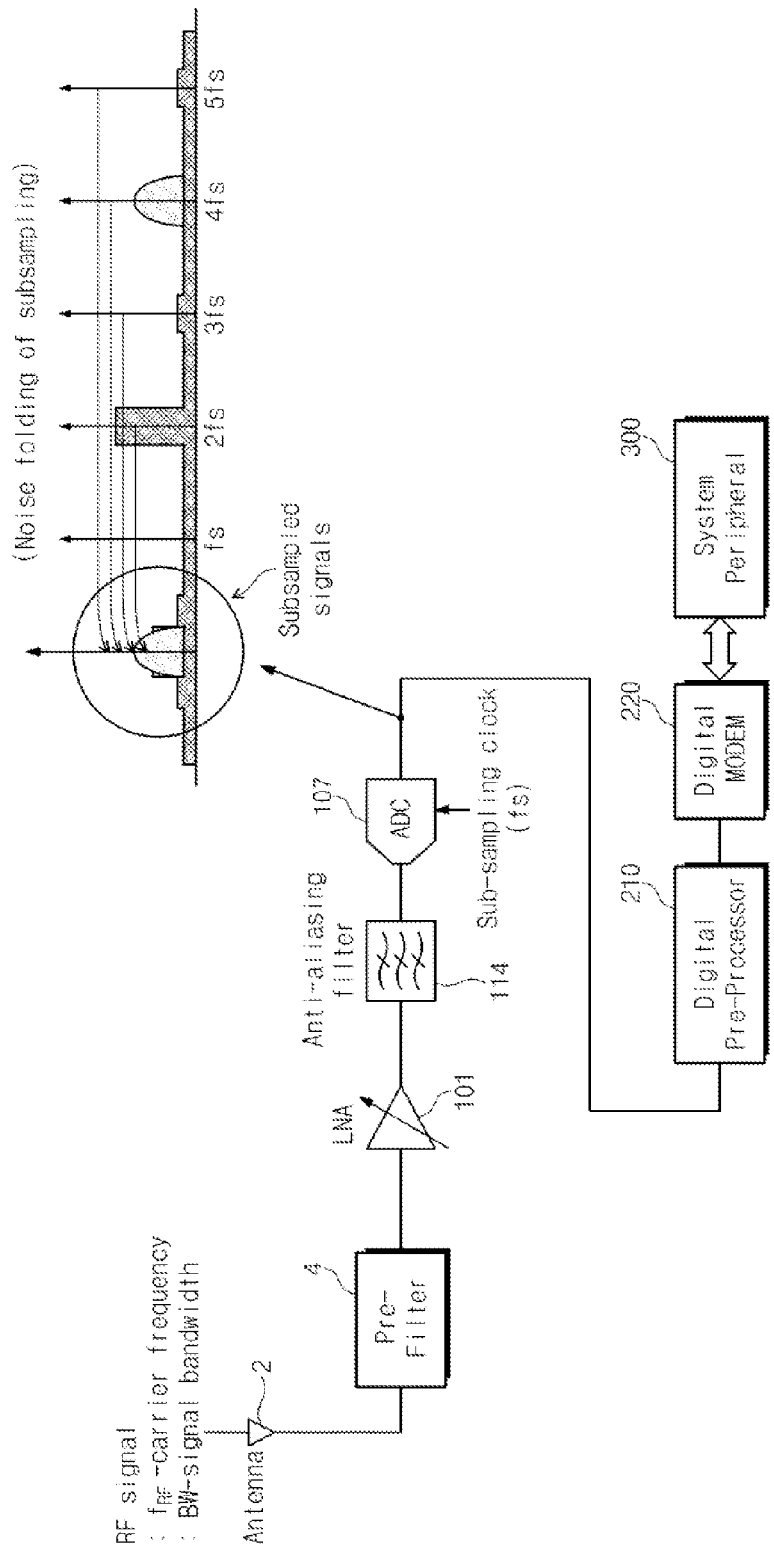
FIG. 3 is a block structure diagram of theoretical sub-sampling receiver.

FIG. 3 is a block structure diagram of theoretical sub-sampling receiver. Referring to FIG. 3, the sub-sampling receiver includes a pre-filter 4, a variable gain low noise amplifier (LNA) 101, an anti-aliasing filter 114 and a sub-sampling ADC 107 at a front stage of digital pre-processor 210.

A conceptual structure of FIG. 3 provides a foundation of receiver structure of the inventive concept.

The sub-sampling method is a method of converting a signal into a low frequency band using a clock having a low sampling frequency as compared with a carrier frequency of signal. The method has a characteristic that all the signal located at a position corresponding to multiple of sampling frequency ($f_s$) are overlapped a finally sampled signal by aliasing as compared with a general Nyquist sampling method. Thus, an anti-aliasing filter has to be located at a front stage of the ADC. However, a semiconductor integrated circuit has a difficulty of embodying an RF filter that can greatly reduce out-of-band signals while having a high selectivity with respect to a wanted in-band signal in an RF band. Performance of Off-chip filter such as SAW filter has been greatly improved together with technological advancements. An ADC has also been greatly improved in an aspect of SNR or an operation speed due to development of fine manufacturing process and development of circuit embodying technology.

In the inventive concept, a sub-sampling receiver is embodied so that it can be applied to a high-end application field by constituting an RF to digital converter based on a structure of ADC capable of sub-sampling and a characteristic of SAW filter. The conditions of RF to digital converter based on ADC to be used in the sub-sampling receiver are as follows.

First, in order to use an RF to digital converter based on ADC in the sub-sampling receiver, when a signal has a high carrier frequency, a signal reduction should be minimized. To achieve this, a bandwidth should be great so that a sampler load of input signal becomes small. Second, the sub-sampling receiver has a purpose of minimizing power consumption but it is necessary that a sampling frequency is higher than a specific frequency to minimize a folding noise. Third, the RF to digital converter based on ADC should convert not only wanted in-band signals but also unwanted in-band signals while having a high sampling frequency. The RF to digital converter based on ADC should have a low noise power signal to minimize an amplification gain burden of front stage of the RF to digital converter. Thus, the RF to digital converter should have a wide dynamic range. Fourth, it should be controlled that output signals I and Q of I/Q RFDC (I/Q ADC) due to a sub-sampling have an orthogonal relation. To achieve this, a phase difference between I/Q RFDC clock inputs being input in the I/Q RFDC should be corrected. A phase difference between I/Q clocks has a specific value to have an orthogonal relation between output signals.

The sub-sampling receiver of the inventive concept satisfies the conditions of ADC and also advantageously acts on a multiple band multiple mode, a multiple input multiple output (MIMO) and carrier aggregation (CA) to be suited to a high-end application. Even though the sub-sampling receiver uses an off-chip RF filter, blocks of analog region among component blocks are markedly reduced and most of the component blocks may be converted into a digital circuit. In the event that the inventive concept is applied to a complicated receiver having functions such as multi-band, multi-mode, MIMO, and carrier aggregation to provide a high user data rate, a structure of the receiver becomes simple due to a structure that blocks of analog region are minimized.

Figure 4:
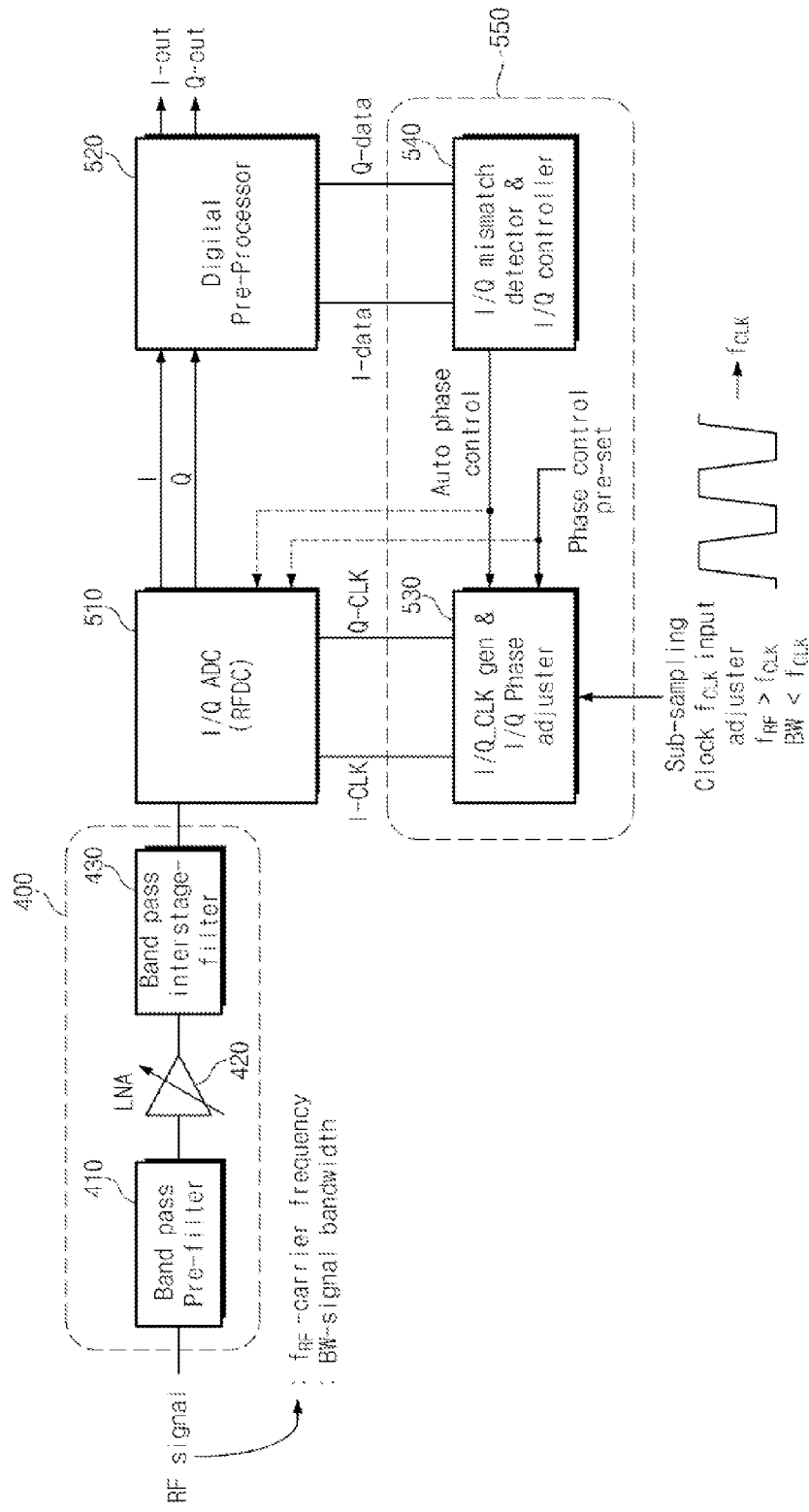
FIG. 4 is a block diagram of sub-sampling receiver in accordance with some embodiments of the inventive concept.

FIG. 4 is a block diagram of sub-sampling receiver in accordance with some embodiments of the inventive concept.

Referring to FIG. 4, the receiver includes an RF front end portion 400, an analog-digital converting portion 510, a signal processing portion 520 and a detection controlling portion 550.

The RF front end portion 400 band pass-filters a signal that is band-passed and amplified again to remove a noise and an interference signal other than a band signal.

The analog-digital converting portion 510 performs a sub-sampling on a carrier frequency of wanted signal band according to clock signals, performs an over-sampling on a wanted signal band according to the clock signals, converts an analog signal output from the RF front end into a digital signal of DC frequency band or intermediate frequency band and has a dynamic range to processing wanted signals and unwanted signals near to the wanted signals.

The signal processing portion 520 digitally pre-processes and demodulates a digital signal output from the analog-digital converting portion 510.

The RF front end portion 400 includes a band pass pre-filter 410, an amplifier 420 and a band pass inter-stage filter 430. The band pass pre-filter 410 band-passes an analog signal having a high carrier frequency and a specific signal bandwidth and reduces an out-filter band noise or an interference signal. The amplifier 420 amplifies a band-passed signal according to a variable gain control signal. The band-pass inter-stage filter 430 band-passes a signal that is band-passed and amplified again and reduces a white noise and an interference signal other than a band signal.

The detection controlling portion 550 includes an IQ_CLK gen & I/Q Phase adjuster 530 and an I/Q mismatch detector & I/Q controller 540.

The IQ_CLK gen & I/Q Phase adjuster 530 receives a sub-sampling clock to generate an I_CLK and a Q_CLK and provide them to the I/Q ADC 510. The IQ_CLK gen & I/Q Phase adjuster 530 receives an auto phase control signal through a feedback loop or a predetermined phase control pre-set signal so that an I/Q digital signal output has an orthogonal relation. In response to the auto phase control signal or the phase control pre-set signal, the IQ_CLK gen & I/Q Phase adjuster 530 controls a phase of I/Q clock so that the I/Q digital signal output has an orthogonal relation.

The I/Q mismatch detector & I/Q controller 540 receives an I/Q signal from the signal processing portion 520 to detect mismatch between the I/Q signals, and then generates a control signal for compensating the detected mismatch to apply it to the IQ_CLK gen & I/Q Phase adjuster 530. That control signal is just the auto phase control signal.

The signal processing portion 520 including a digital pre-processor may include a decimation filter for lowering a sampling rate of wanted signal band from output signals of the analog-digital converting portion to a integer ratio or a fraction ratio that is set, a frequency mixer for a carrier frequency conversion of digitalized signal, a channel select filter low-passing only signals of wanted band, a variable gain amplifier and a controller making a signal passing through the channel select filter have an output of specific magnitude. The signal processing portion 520 may further include at least one of an IQ mismatch/DC offset remover for removing IQ mismatch or DC offset, and a detector detecting a signal magnitude.

In the RF front end portion 400, a signal connection form between the band pass pre-filter 410, the amplifier 420 and the band pass inter-stage filter 430 may be sequentially one of single ended-single ended-single ended, single ended-single ended-single to differential, single ended-single to differential-differential, and single to differential-differential-differential.

Each of the amplifier 420 and the inter-stage filter 430 of the RF front end portion 400 may be embodied with one or more blocks.

A phase difference between two input clocks applied to the I/Q RFDC 510 to guarantee an orthogonal phase relation of I/Q digital signal output is controlled by the IQ_CLK gen & I/Q Phase adjuster 530.

In order for a sub-sampling receiver having a structure like FIG. 4 to properly operate, a characteristic of an anti-aliasing filter, that is, the band pass intersatage filter 430 located at front stage of the analog-digital converting portion 510 should be superior. That is, the band pass interstage filter 430 should have a high selectivity with respect to in-band signals in an RF band and a great reduction characteristic with respect to out-of-band signals in the RF band.

Figure 5:
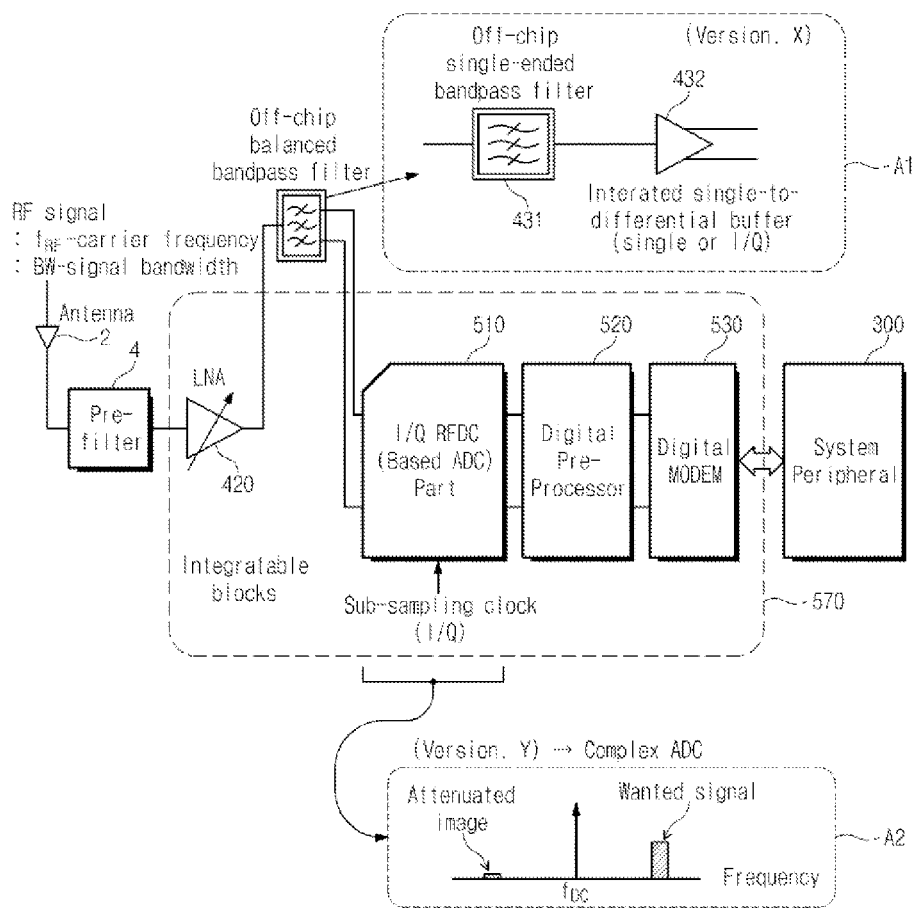
FIG. 5 is a block diagram of sub-sampling receiver in accordance with some other embodiments of the inventive concept.

Accordingly, as illustrated in FIG. 5, a receiver including an off-chip RF pre-filter 4, a variable gain low noise amplifier 420, an inter-stage off-chip RF filter 430, the RF-to-digital converter 510 directly converting a signal of RF band into DC band or IF band using a sub-sampling method and a digital pre-processor 510 may be embodied as an alternative.

FIG. 5 is a block diagram of sub-sampling receiver in accordance with some other embodiments of the inventive concept.

Referring to FIG. 5, an off-chip RF pre-filter 4 band-filtering a signal inputting through an antenna 2 is located outside an integrated circuit chip 570. The antenna 2 is illustrated only to explaining a receiver and is not essential in an application of receiver.

A variable gain low noise amplifier 420 amplifying an output of the pre-filter 4 may be embodied inside the integrated circuit chip 570.

An inter-stage off-chip RF filter 430 of balanced type having a single-to-differential function while band-filtering an output signal of the low noise amplifier 420 is located outside the integrated circuit chip 570.

An I/Q RFDC 510 based on ADC receiving sub-sampling clocks I and Q and a differential output signal of the inter-stage off-chip RF filter 430 may be embodied inside the integrated circuit chip 570.

The sub-sampling clocks I and Q have any phase difference so that output signals I and Q of the I/Q RFDC 510 based on ADC have an orthogonal relation.

A digital pre-processor 520 and a digital modem 530 processing a digital output signal may be embodied inside the integrated circuit chip 570.

The off-chip RF pre-filter 4 may be embodied by a single filter or a duplexer and has to be linked with an RF switch to be applied to a multiple band.

In FIG. 5, the off-chip RF band pass filter 430 may include a single-ended off-chip RF filter 431 and a single-to-differential buffer 432 as illustrated in a reference character A1.

The I/Q RFDC 510 has a structure making a receiver operate as a direct conversion receiver or a low-IF conversion receiver. The I/Q RFDC 510 may be embodied to be an independent path. When the I/Q RFDC 510 has a low-IF structure, the I/Q RFDC 510 can generate an output having one side-band as illustrated in a reference character A2 by using a signal exchange between I/Q path RFDCs. The I/Q RFDC 510 can have a function of complex sampling.

Figure 6:
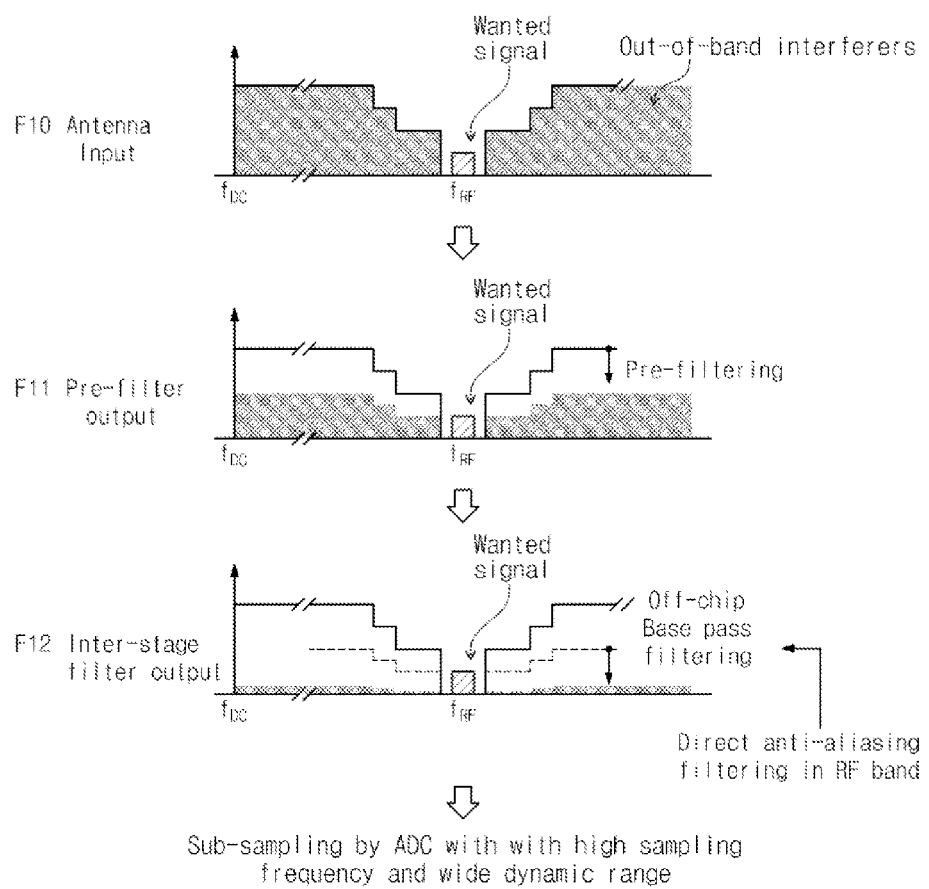
FIG. 6 shows waveforms of input/output signals sequentially appeared in the block diagram of sub-sampling receiver of FIG. 4 or FIG. 5.

FIG. 6 shows waveforms of input/output signals sequentially appeared in the block diagram of sub-sampling receiver of FIG. 4 or FIG. 5.

Referring to FIG. 6, if a signal waveform F10 is received to the pre-filter 4 through the antenna 2, the pre-filter 4 performs a pre-processing to output a signal waveform F11. The inter-stage off-chip RF filter 430 filters a signal output from the amplifier 420 using a direct anti-aliasing filtering method to output a signal like a signal waveform F12. In FIG. 6, a horizontal axis represents a signal frequency and a vertical axis represents a voltage level of signal.

As illustrated in the signal waveform F12, the off-chip filter has a high selectivity with respect to in-band signals and greatly attenuates out-of-band signals, so that the ADC of back stage can easily perform a declining conversion of the in-band signals by sub-sampling operation.

Since the second off-chip RF filter 430 is embodied at back stage of LNA, the sub-sampling receiver can be applied to a high-end application field.

Examples of parts that can be used as the off-chip RF filter are SAW filter, FBAR filter, etc.

Figure 7A:
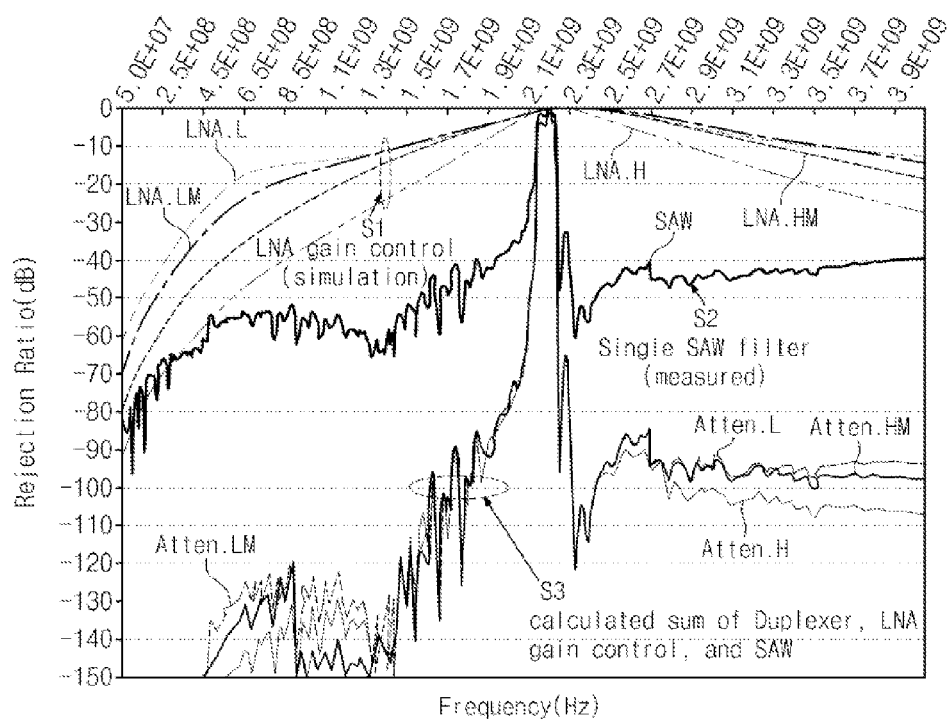
FIG. 7A is a frequency characteristic diagram of signals appeared through the block diagram of sub-sampling receiver of FIG. 4 or FIG. 5.

FIG. 7A is a frequency characteristic diagram of signals appeared through the block diagram of sub-sampling receiver of FIG. 4 or FIG. 5. FIG. 7B is a drawing illustrating a production and an operation of SAW filter applied to the FIG. 4 or FIG. 5. FIG. 7C is a drawing illustrating a production form of FBAR filter applied to the FIG. 4 or FIG. 5.

The SAW filter illustrated in FIG. 7B describes a surface acoustic wave filter. The SAW filter performing a filtering using a surface wave of electromagnetic wave filters a signal on the basis of piezoelectric principle of converting a mechanical vibration of piezoelectric material into an electrical signal. If a relatively fast electromagnetic wave is converted into a slow acoustic wave, only a wavelength of wanted frequency passes. As illustrated in FIG. 7B, if two metal plates of comb shape are disposed to be dislocated on both sides of piezoelectric material respectively, and then an electrical signal is input from one side, a SAW (surface elastic wave) is generated on the piezoelectric material. A mechanical vibration called a surface elastic wave is converted into an electrical signal again at the other side. If a surface elastic wave frequency of piezoelectric material itself is different from a frequency of electrical signal which is input, a signal is not transmitted and is disappeared. That is, the filter passes only a signal having the same frequency as the mechanical frequency of filter itself. Thus, the SAW filter is a band pass filter (BPF). Since the SAW filter has a narrow bandwidth as compared with a filter using an LC resonant principle, it can almost completely filter signals of unnecessary frequency. The SAW filter is well adopted when it is necessary to accurately filter signals of wanted frequency. The (size) of SAW filter is relatively small as compared with a ceramic filter having similar performance.

The film bulk acoustic resonator (FBAR) filter in FIG. 7C is a filter for communication using a piezoelectric effect. The FBAR deposits zinc oxide (ZnO) or aluminum nitride (AlN) which is piezoelectric material on a silicon substrate using an RF magnetron sputtering method to generate a piezoelectric phenomenon. Resonance occurs within a specific frequency band and a filtering is performed using the resonance.

If an electrical signal is input to an upper electrode or a lower electrode, resonance occurs due to a piezoelectric phenomenon and a bulk acoustic wave (BAW) being generated from the resonance is used. If a BAW frequency is equal to a frequency of electrical signal which is input, a resonance phenomenon occurs and a resonator using the resonance phenomenon is embodied by the FBAR filter. A duplexer using the FBAR filter can be embodied.

Referring to FIG. 7A, a use effect of off-chip RF filter is illustrated.

In a conventional integrated circuit receiver, a mixer is used to select only wanted signals. A signal of which frequency is lowered by a mixer is low-filtered. The reason why using a mixer is because it is difficult to embody an integrated circuit that can process only a signal of wanted RF band in the RF band.

However, in the receiver in accordance with the inventive concept, by using an off-chip filter instead of an integrated circuit, many constituent blocks essentially used in a conventional integrated circuit receiver are removed. Thus, a characteristic of off-chip RF filter is represented through FIG. 7A and an effect of invented structure is proved.

A reference character S2 represents a characteristic of SAW filter and a reference character 51 represents a characteristic of LNA gain control. A reference character S3 represents a characteristic of out-of-band attenuation occurring at a front-end portion. An LC load is used and a band pass characteristic of LNA is shown. In FIG. 7A, a horizontal axis represents a frequency and a vertical axis represents a rejection ratio.

Graphs in FIG. 7A are only examples measured using practical parts to verify validity or a prediction effect of the inventive concept. Thus, since a characteristic of the SAW filter or the FBAR filter applied to the sub-sampling receiver has a room to be improved or modified, there is no problem to embody the inventive concept. The graph of FIG. 7A shows that a theoretical sub-sampling receiver that already exists can be really embodied.

Figure 8:
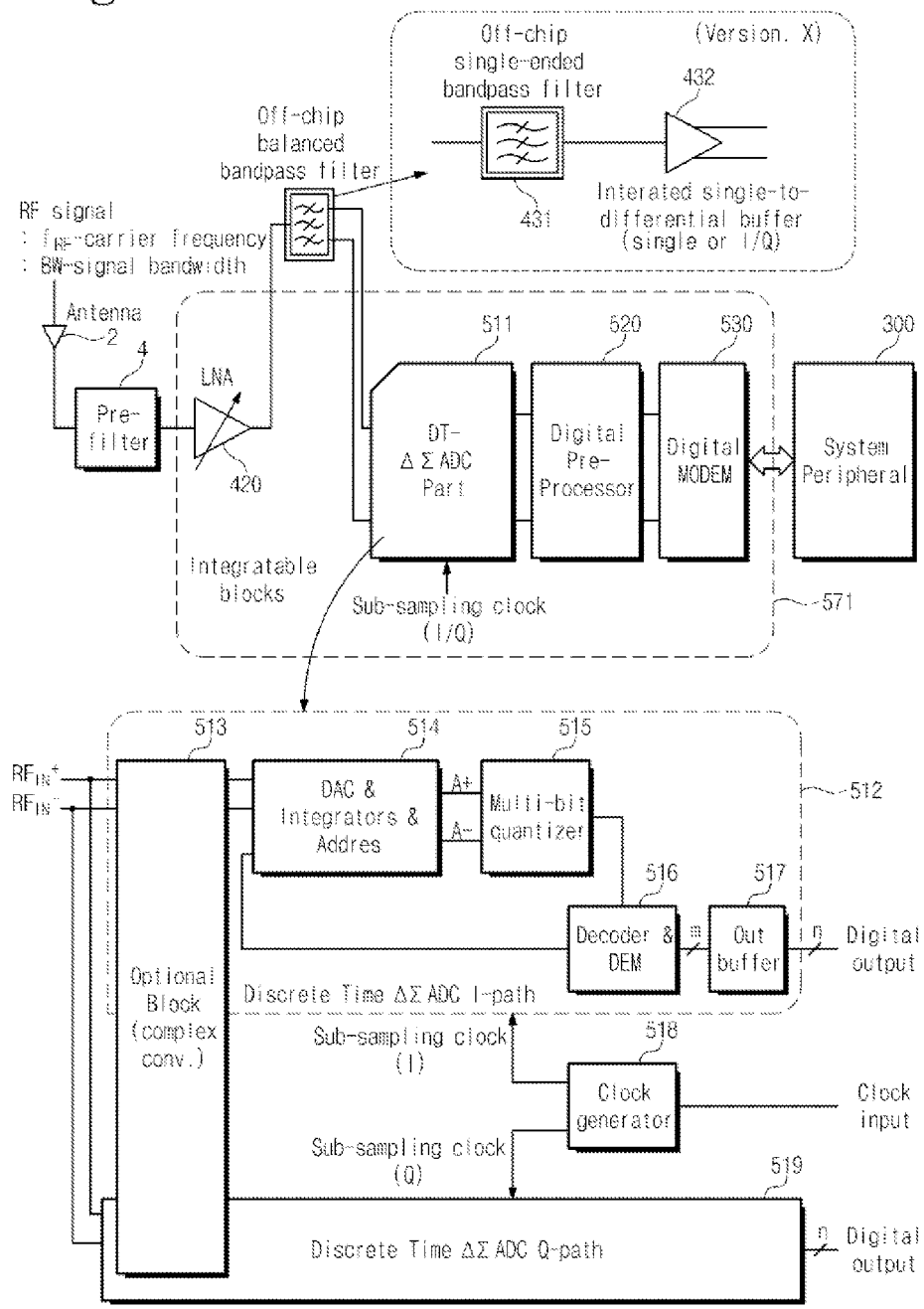
FIG. 8 is a receiver block diagram in accordance with some other embodiments of the inventive concept.

FIG. 8 is a receiver block diagram in accordance with some other embodiments of the inventive concept.

In FIG. 8, a discrete time delta-sigma ADC 511 is adopted to embody a sub-sampling receiver using the second off-chip RF filter 430.

The receiver of FIG. 5 is a receiver of conceptual structure focusing on adopting the second off-chip RF filter. The receiver of FIG. 8 is a receiver of real embodying structure that adopts the second off-chip RF filter 430 and completely satisfies requirements of the RFDC based on ADC.

In FIG. 8, a delta-sigma ADC 511 is divided into a discrete-time type delta-sigma ADC and a continuous-time type delta-sigma ADC depending on a location of sampler. The delta-sigma ADC 511 becomes the discrete-time type delta-sigma ADC when the sampler is located at the front and the delta-sigma ADC 511 becomes the continuous-time type delta-sigma ADC when the sampler is located at the back of the filter.

Between the two types, the discrete-time type delta-sigma ADC has relatively superior characteristic. The characteristic may include a low noise level and a wide bandwidth. The characteristic is advantageous to the conditions that a noise due to a sub-sampling should be minimized and a sampling frequency should be high.

The discrete-time type delta-sigma ADC 511 includes an I/Q path and a clock generator 518. The clock generator 518 may include a constituent calibrating a phase difference between I/Q RFDC clock inputs applied to I/Q RFDC so that output signals I and Q of I/Q RFDC (I/Q ADC) due to a sub-sampling have an orthogonal phase relation.

One path of ADC, as a constituent illustrated in a lower part of FIG. 8, may include a DAC & integrators & adders 514, a multi-bit quantizer 515, a decoder & DEM (dynamic element matching) block 516 and an output buffer 517 that operate in a discrete time region.

An optional block 513 may be located at a front stage of the I/Q path. The optional block 513 may operate in a complex conversion method which is linked with an ADC input signal of the I/Q path to operate and in a general quadrature conversion method which receives an ADC input signal of the I/Q path to operate.

Figure 9:
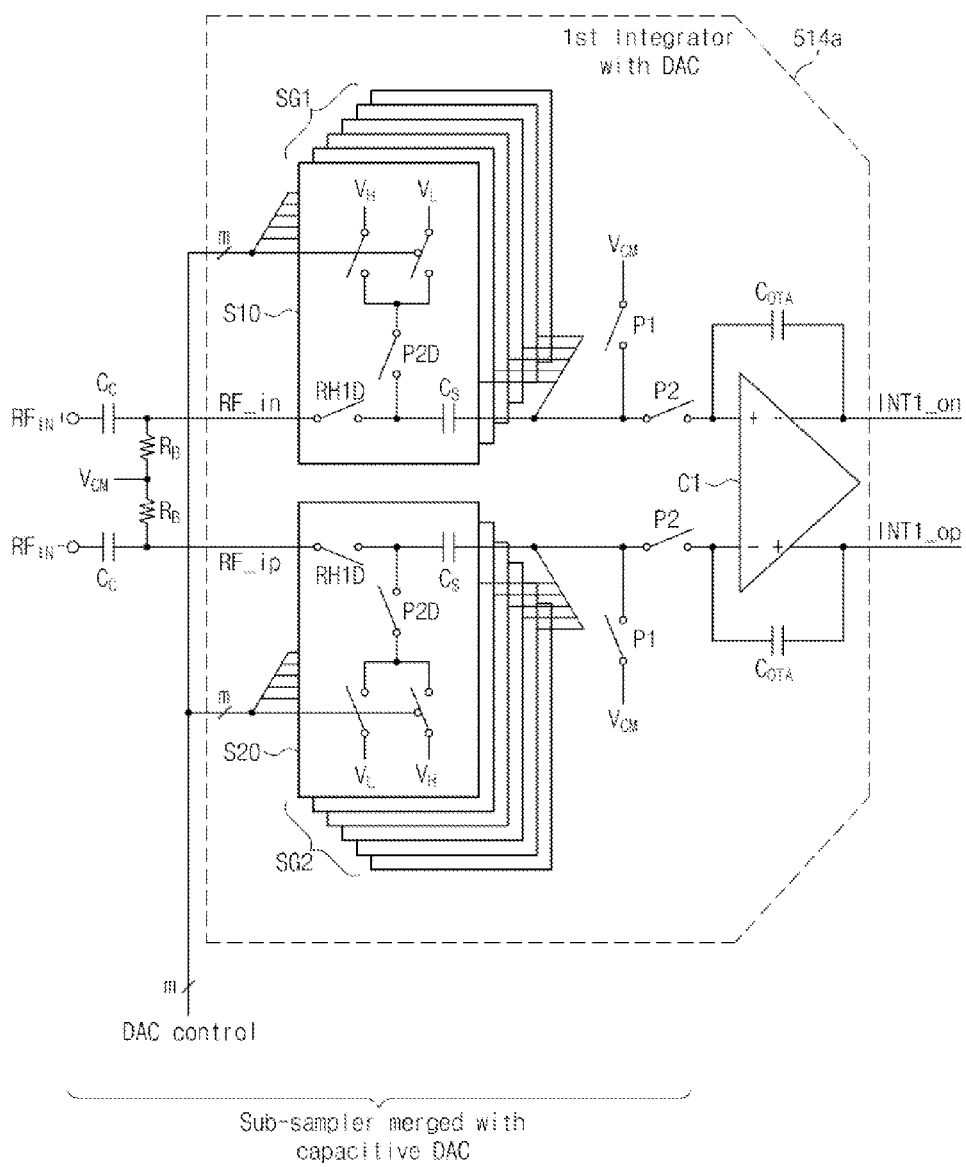
FIG. 9 is a detailed circuit of integrator including a first stage sampler of RFDC and DAC circuits illustrated in FIG. 8.

FIG. 9 is a detailed circuit of integrator including a first stage sampler of RFDC and DAC circuits illustrated in FIG. 8.

The ADC 511 of FIG. 8 uses the multi-bit quantizer 515. The decoder & DEM 516 connected to an output terminal of the multi-bit quantizer 515 feedbacks a digital output value to the DAC & integrators & adders 514.

Since having a structure that a digital output value negative-feedbacks to be input to a first stage sampler portion, in FIG. 9, a sub-sampler having a merged capacitive DAC circuit is embodied so as to easily embody a circuit and quickly set a first stage integrator.

In FIG. 9, a sub-sampler 514a includes a first sub-sampler group SG1, a second sub-sampler group SG2 and a comparator C1.

A sampling capacitor Cs in the sub-sampler group constitutes a sub-sampler together with a switch receiving a clock signal RH1D when a sampling is performed.

Since an input signal of the ADC is an RF signal, it is necessary to widen a bandwidth and improve linearity of signal when a signal is input in a power sampler. In FIG. 9, a clock signal RH1D is generated using a bootstrap circuit. The generated clock signal RH1D is great as compared with a general clock signal.

Figure 10:
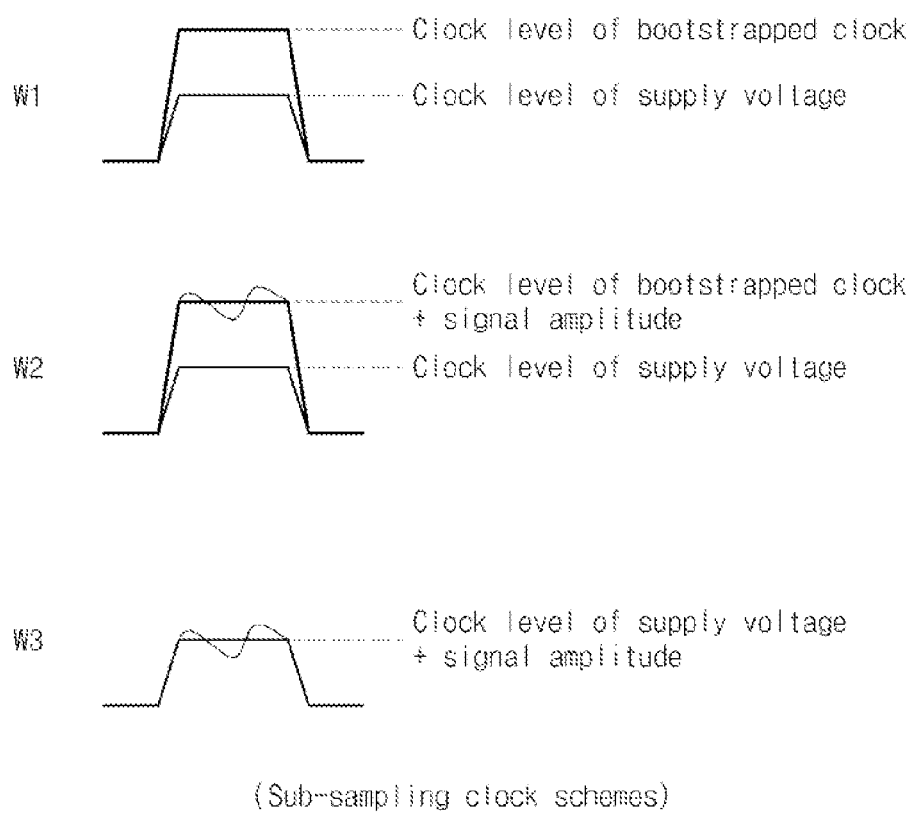
FIG. 10 shows waveforms of sub-sampling clocks related to FIG. 9.

FIG. 10 shows waveforms of sub-sampling clocks related to FIG. 9.

Referring to FIG. 10, when embodying a sub-sampling receiver, a clock driving method performing a sub-sampling on a signal of RF band is shown. As illustrated in FIG. 10, a clock (waveform W1) bootstrapped as compared with a level of power supply voltage of chip, a clock scheme using a clock signal (waveform W2) that an amplitude of signal following a change of input signal is added to an amplitude of bootstrapped clock signal, or a clock (waveform W3) that an amplitude of power supply voltage follows a change of input signal may be used.

According to embodiments of the inventive concept, by performing an oversampling on a wanted signal band while converting a received RF signal into an IF signal or a DC signal using a sub-sampling method, even noise signals near to the wanted signal are converted into digital signals. Thus, noise signals near to wanted signals can be digitally processed. By applying second off-chip filter to intensify a function of RF front-end, an area of RF receiver chip, a design cost and power consumption are reduced.

If function blocks of receiver are designed in a digital region as much as possible, it is easily applied to a multi-standard and whenever a process is upgraded, problems can be solved by a digital design change. Consequently, a digital receiver having a shortened time-to-market is provided.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the present invention. Accordingly, all such modifications are intended to be included within the scope of the present invention as defined in the claims. The present invention is defined by the following claims, with equivalents of the claims to be included therein.

What is claimed is:

1. A receiver comprising:
   an RF front end portion band pass-filtering an analog signal and amplifying the band-passed signal to attenuate a noise and an interference signal other than the band-passed signal;
   an analog-digital converting portion that performs a sub-sampling on a carrier frequency of a wanted signal band according to clock signals, performs an over sampling on the wanted signal band according to the clock signals, converts an analog signal output from the RF front end portion into a digital signal of a DC frequency band or an intermediate frequency band, and has an input signal range capable of processing a wanted signal and unwanted signals near to the wanted signal;
   a signal processing portion digitally pre-processing and demodulating a digital signal output from the analog-digital converting portion; and
   a detection controlling portion detecting a mismatch between I/Q channel data of the digital signal output from the signal processing portion and controlling phases of the clock signals.

2. The receiver of claim 1, wherein the RF front end portion comprises:
   a band pass pre-filter band pass-filtering the analog signal having a carrier frequency higher than a frequency of a sub-sampling clock and an arbitrary signal bandwidth and attenuating a noise or an interference signal outside a filtering band of the band pass pre-filter;
   an amplifier amplifying an analog signal passing through the band pass pre-filter according to a variable gain control signal; and
   a band pass interstage filter band-pass-filtering an analog signal output from the amplifier and attenuating a white noise or an interference signal outside a filtering band of the band pass interstage filter.

3. The receiver of claim 2, wherein a signal connection form between the band pass pre-filter, the amplifier, and the band pass interstage filter of the RF front end portion is any one of single ended-single ended-single ended, single ended-single-ended-single to differential, single ended-single to differential-differential, and single to differential-differential-differential.

4. The receiver of claim 2, wherein the amplifier and the band pass interstage filter of the RF front end portion are combined with each other with one or more blocks.

5. The receiver of claim 1, wherein the analog-digital converting portion outputs the digital signal as I channel data and Q channel data.

6. The receiver of claim 5, wherein the detection controlling portion comprises:
   an I/Q mismatch detecting and controlling portion detecting a mismatch between the I/Q channel data output from the signal processing portion and generating an auto phase control signal to compensate the detected mismatch; and
   an I/Q CLK generating and phase controlling portion receiving a sub-sampling clock to provide the clock signals to the analog-digital converting portion as I/Q clock signals (I_CLK and Q_CLK) and controlling a phase difference between the I_CLK and the Q_CLK in response to the auto phase control signal or a preset phase control signal so that phases of the I/Q channel data maintain an orthogonal relation.

7. The receiver of claim 6, wherein in the event that a common analog signal being applied to the analog-digital converting portion is applied as an I/Q path signal, the auto phase control signal is a signal controlling a phase and a magnitude of the I/Q path signal.

8. The receiver of claim 6, wherein the mismatch compensation between the I/Q channel data is performed periodically, continuously or for a specific time.

9. The receiver of claim 1, wherein the signal processing portion comprises:
   a decimation filter lowering a sampling rate of the wanted signal band in the digital signal output from the analog-digital converting portion to a integer ratio or a fraction ratio;
   a frequency mixer converting a carrier frequency of the digital signal;
   a channel select filter low-passing a signal of the wanted band;
   a variable gain amplifier and a controller adjusting the signal passing through the channel select filter to have an output of a specific magnitude;
   at least one of an IQ mismatch/DC offset remover removing IQ mismatch or DC offset; and
   a detector detecting a magnitude of the digital signal.

10. The receiver of claim 1, wherein the analog-digital converting portion includes a front stage including samplers, the samplers each independently sampling output signals of the RF front end portion in an I channel and a Q channel or complexly sampling the output signals of the RF front end portion by linking the I channel with the Q channel, and
   wherein the samplers of the front stage of the analog-digital converting portion are configured to use, as a switch clock, a bootstrapped clock signal having an amplitude greater than an amplitude of a power supply voltage, a clock signal obtained by adding an amplitude of a signal following a change of an input signal to an amplitude of the bootstrapped clock signal, or a clock signal obtained by adding the amplitude of the power supply voltage to the amplitude of the signal following the change of the input signal.

11. The receiver of claim 1, wherein converting the analog signal into the digital signal includes converting both the wanted signal in the analog signal and the unwanted signals in the analog signal that are near to the wanted signal, and
   wherein digitally pre-processing the digital signal includes removing the unwanted signals from the digital signal.

12. A receiver comprising:
   an off-chip band pass filter of an interstage type receiving an output of a variable gain amplifier to perform a direct anti-aliasing filtering, the off-chip band pass filter being embodied in a type of a surface acoustic wave (SAW) filter or a film bulk acoustic resonator (FBAR) filter;
   a digital signal processing portion digitally removing a noise signal near to a frequency band set in a digital signal being received and digitally processing a signal within the set frequency band; and
   an analog-digital converter generating and providing the digital signal to the digital signal processing portion by converting an analog signal output from the off-chip band pass filter into the digital signal covering an input signal range to process a wanted signal and unwanted signals near to the wanted signal using a sampling frequency clock,
   wherein the analog-digital converter includes a front stage including samplers, the samplers each independently sampling output signals of the off-chip band pass filter in an I channel and a Q channel or complexly sampling the output signals of the off-chip band pass filter by linking the I channel with the Q channel, and wherein the samplers located at the front stage of the analog-digital converter are configured to use, as a switch clock, a bootstrapped clock signal having an amplitude greater than an amplitude of a power supply voltage, a clock signal obtained by adding an amplitude of a signal following a change of an input signal to an amplitude of the bootstrapped clock signal, or a clock signal obtained by adding the amplitude of the power supply voltage to the amplitude of the signal following the change of the input signal.

13. A receiver comprising:
a first off-chip filter band-filtering an input signal;
a single input-output variable gain amplifier band-filtering and amplifying a signal output from the first off-chip filter and changing a range of the input signal into a range of an input signal of a next stage;
a second off-chip filter including a surface acoustic wave (SAW) filter or a film bulk acoustic resonator (FBAR) filter to band-filter an output of the single input-output variable gain amplifier;
an RF to digital converter (RFDC) converting an output signal of the second off-chip filter into a digital signal of a DC frequency band or an intermediate frequency band using a sampling frequency, performing a sub-sampling on a carrier frequency of a wanted signal, performing an over sampling on a band of the wanted signal as a clock signal, and having an input signal range adapted to process the wanted signal and unwanted signals near to the wanted signal; and
a digital processor performing a signal frequency conversion, a channel select filtering, a variable gain amplification, and a sampling frequency conversion on the digital signal converted in the RFDC through a digital signal processing.

14. The receiver of claim 13, if the RFDC is an I/Q analog-digital converter (ADC), further comprising a clock generator generating I/Q sub-sampling clocks that make an output phase relation of the I/Q ADC maintain an orthogonal state and controlling a phase difference between the I/Q sub-sampling clocks.

15. The receiver of claim 13, wherein the second off-chip filter has a single-to-differential input/output structure.

16. The receiver of claim 13, wherein the second off-chip filter comprises:
the SAW filter or the FBAR filter having a single-to-single input/output; and
an integrated circuit having a single-to-differential input/output.

17. The receiver of claim 13, wherein the RFDC includes a front stage including samplers, the samplers each independently sampling output signals of the second off-chip filter in an I channel and a Q channel, or complexly sampling the output signals of the second off-chip filter by linking the I channel with the Q channel.

18. The receiver of claim 17, wherein the samplers of the front stage of the RFDC are configured to use, as a switch clock, a bootstrapped clock signal having an amplitude greater than an amplitude of a power supply voltage, a clock signal obtained by adding an amplitude of a signal following a change of an input signal to an amplitude of the bootstrapped clock signal, or a clock signal obtained by adding the amplitude of the power supply voltage to the amplitude of the signal following the change of the input signal.

19. The receiver of claim 13, wherein the RFDC is embodied on the basis of discrete time delta-sigma ADC structure.

20. The receiver of claim 13, wherein in the event that the RFDC is embodied in an I/Q path form, the RFDC comprises:
an optional conversion block that can be included or removed for a selective operation of an I/Q complex conversion or an I/Q independent conversion;
a digital-analog converter (DAC) & integrator & adders block processing an input signal and a negative feedback signal;
a multi-bit quantizer converting an output of the DAC & integrator & adders block into a multiple digital bit signal;
a dynamic element matching (DEM) block decoding an output of the multi-bit quantizer or intensifying a linearity of a multi-bit DAC receiving the output of the multi-bit quantizer by a negative feedback input terminal;
an output buffer for a signal output of the I/Q path; and
a clock generator providing a clock to the blocks.

21. The receiver of claim 13, wherein converting the output signal into the digital signal includes converting both the wanted signal in the output signal and the unwanted signals in the output signal, and
wherein the digital processor removes the unwanted signals from the digital signal.

* * * * *